United States Patent [19]

Boundy

[11] 4,278,834
[45] Jul. 14, 1981

[54] VERSATILE, ELECTRIFIED SPACE DIVIDING WALL PANEL SYSTEM

[75] Inventor: Bruce K. Boundy, Holland, Mich.

[73] Assignee: Westinghouse Electric Corp., Pittsburgh, Pa.

[21] Appl. No.: 967,181

[22] Filed: Dec. 6, 1978

[51] Int. Cl.³ .............................................. H02G 3/00
[52] U.S. Cl. .................................. 174/48; 339/22 R; 339/184 M
[58] Field of Search ............... 174/48, 49, 53; 339/20, 339/23, 22 R, 184 M; 160/135, 127; 52/221, 173, 238, 239, 241, 242

[56] References Cited

U.S. PATENT DOCUMENTS

| | | |
|---|---|---|
| 3,046,513 | 7/1962 | Crowley ..................... 339/184 M X |
| 3,377,756 | 4/1968 | Polhamus . |
| 3,529,389 | 9/1970 | Wilkins . |
| 3,716,651 | 2/1973 | Werner ................................. 174/53 |
| 3,762,116 | 10/1973 | Anderson . |
| 3,841,042 | 10/1974 | Siegal . |
| 3,856,981 | 12/1974 | Boundy . |
| 3,877,191 | 4/1975 | Munsey . |
| 4,060,294 | 11/1977 | Haworth . |
| 4,097,918 | 6/1978 | Anderson et al. . |
| 4,135,775 | 1/1979 | Driscoll ............................ 339/23 X |

Primary Examiner—Elliot A. Goldberg
Assistant Examiner—D. A. Tone
Attorney, Agent, or Firm—B. R. Studebaker

[57] ABSTRACT

A versatile, electrified space dividing wall panels system including wall panels having baseboard raceways adjacent their bottom edges and electrically connected terminal blocks at each end of the baseboard raceway which include longitudinally and outwardly directed male electrical terminals adapted to receive female connectors from a source of electrical power or transfer electrical power to an adjacent wall panel. Each of said terminal blocks are adapted to receive plug-in convenience outlets in each side thereof through the raceway side walls.

4 Claims, 14 Drawing Figures

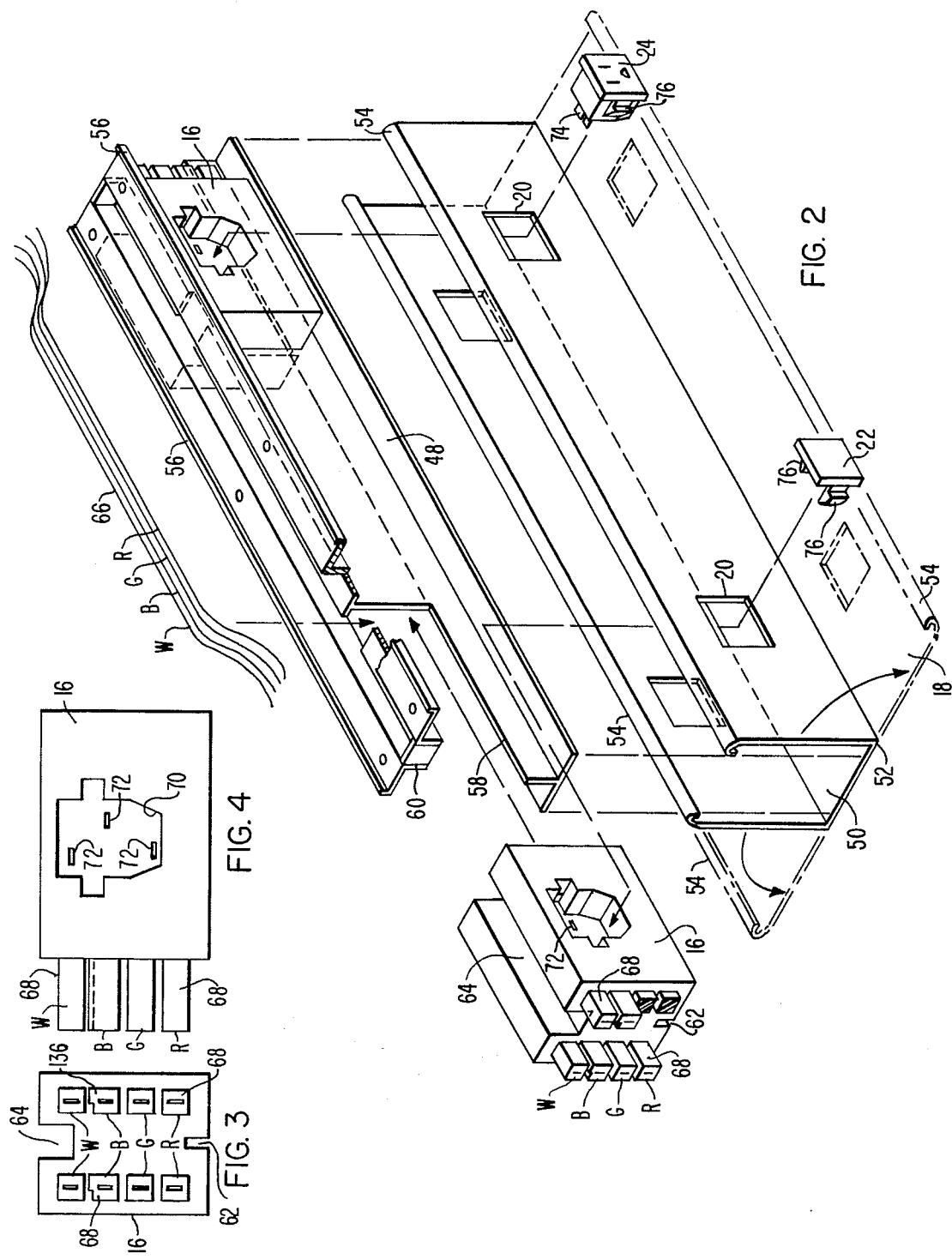

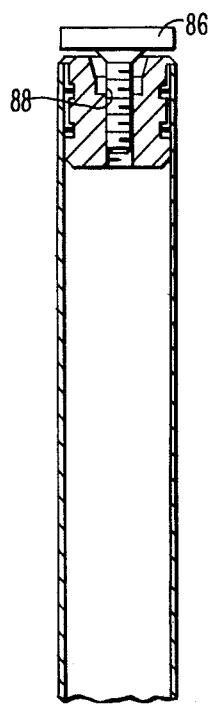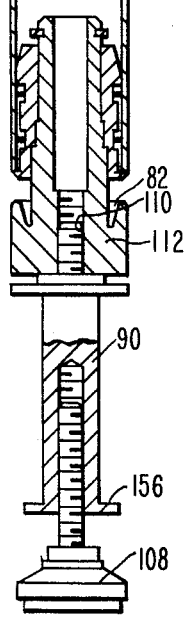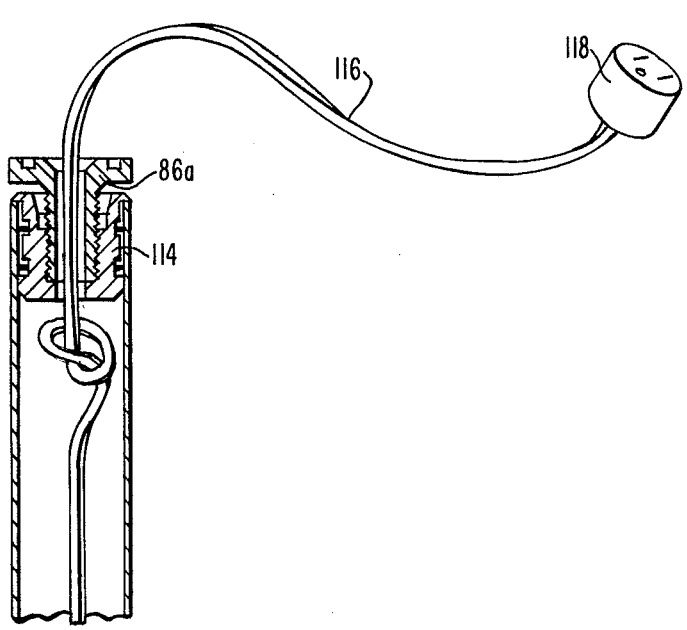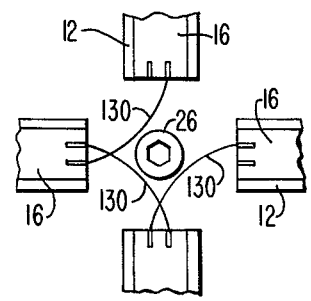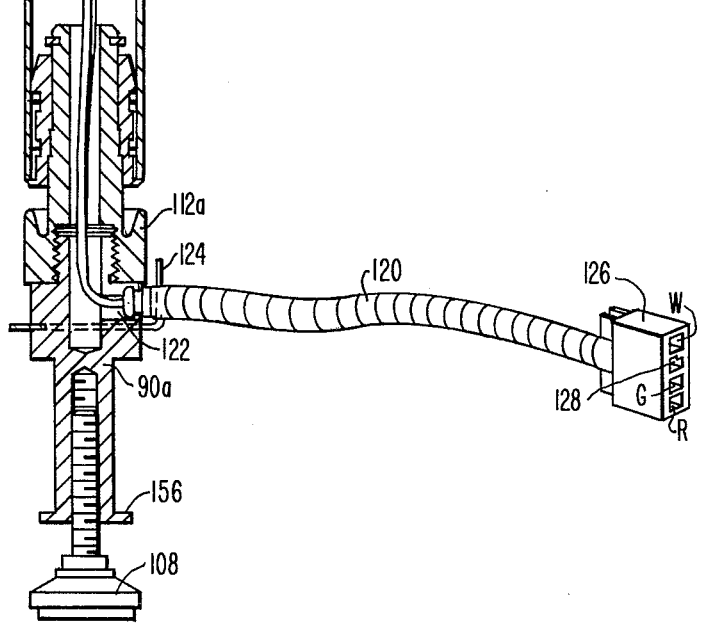
FIG. 7  FIG. 8  FIG. 13

VERSATILE, ELECTRIFIED SPACE DIVIDING WALL PANEL SYSTEM

BACKGROUND OF THE INVENTION

Over the last several years there has been a dramatic increase in the use of the open office plan system wherein movable space dividing wall panels are employed to subdivide an open office area into a plurality of work stations. A recent innovation in the open office plan system is to provide ambient and task lighting at the work stations as opposed to general overall illumination from predesigned and prelocated ceiling lighting fixtures. The addition of task and ambient lighting systems to the work stations when added to the prior need of electrical power to the stations for convenience outlets to operate electric typewriters, calculators and other business machines has created the need for total electrification of the space dividing wall panels. Although several such systems are now in existence they have significant drawbacks. In general, these systems have electrical convenience outlets preset and prewired at specific locations thereby fixing the electrical power requirements for the panel system. Several use the same power distribution system for both the ambient and task lighting requirement as well as the convenience outlet requirement which prohibits the selective activation of these two separate systems. Inflexibility is another characteristic of existing systems which permits the system to only be adapted to situations where the electrical power is fed from the floor and require a distinctly different system where electrical power is found in the ceiling of the open office plan area.

The ability to locate convenience outlets based on need rather than restrictive preset locations for these convenience outlets can substantially extend the area which a conventional 20-amp circuit can service. Total integration of the entire system through universal plug-type connectors can adapt the system for both floor and ceiling infeed as well as electrical distribution from one space dividing wall panel to another regardless of the angular orientation between the panels.

SUMMARY OF THE INVENTION

This invention relates to electrified space dividing wall panels and more particularly to a versatile system which provides universal interconnection between adjacent prewired spaced dividing wall panels which include selective convenience outlets along the base thereof.

The versatile, electrified, spaced dividing wall panel system of this invention includes at least one space dividing wall panel having an elongated covered channel extending along and secured to the bottom edge thereof. The covered channel has apertures in the side walls thereof which communicate with a pair of spaced terminal blocks disposed within the elongated covered channel adjacent the ends thereof and near the side edges of the panel. Wire means disposed within the elongated covered channels electrically interconnect the terminal blocks. The terminal blocks include male power terminals extending outwardly from the ends thereof toward the side edges of the panel, which male power terminals are adapted to receive female connectors from a source of electrical power or from an adjacent wall panel. Each of the terminal blocks are adapted to receive through the apertures in the side walls of the covered channel convenience electrical outlets or dummy plugs according to need. Flexible jumper cables are employed having the female connectors on each end thereof to electrically connect adjacent space dividing wall panels. Additional versatility is provided by employing dual circuits in each of the female connectors and each of the terminal blocks thereby permitting a separate circuit for ambient lighting.

BRIEF DESCRIPTION OF THE DRAWINGS

Many of the attendant advantages of the present invention will become more readily apparent and better understood as the following detailed description is considered in connection with the accompanying drawings in which:

FIG. 2 is an isometric exploded view of the horizontal baseboard power distribution channel of this invention;

FIG. 3 is a front elevational view of the external end of the terminal block;

FIG. 4 is a side elevational view of the terminal block;

FIG. 7 is a sectional view of a conventional space dividing wall panel support post;

FIG. 8 is a sectional view of a modified space dividing wall panel support post providing electrical connection to an ambient lighting fixture;

FIG. 13 is a schematic illustration of four panels electrically interconnected in accordance with the present invention.

DESCRIPTION OF THE PREFERRED EMBODIMENT

Figure 1A:
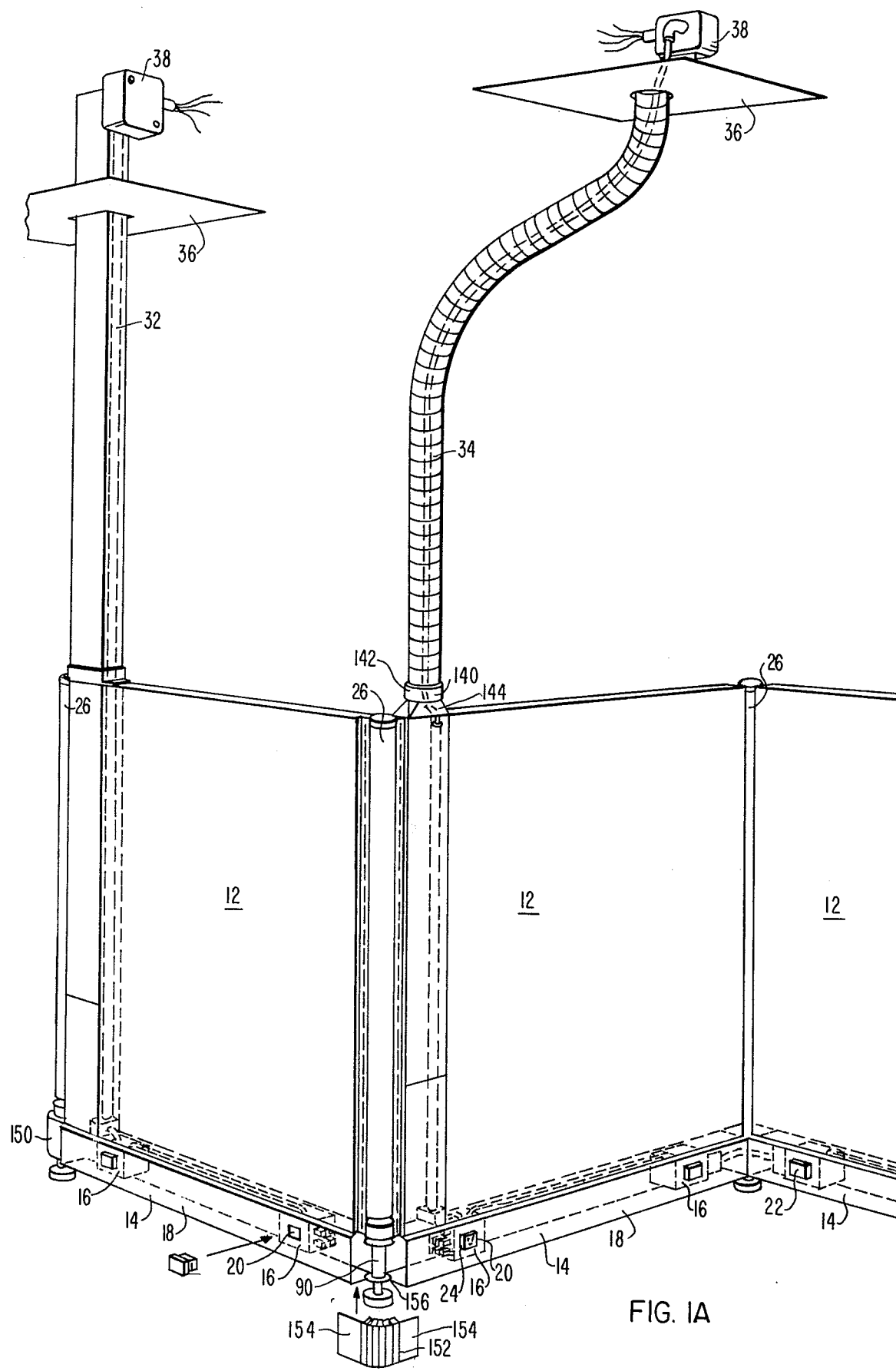
FIGS. 1A and 1B are isometric views of the versatile electrified space dividing wall panel system of this invention.
Figure 1B:
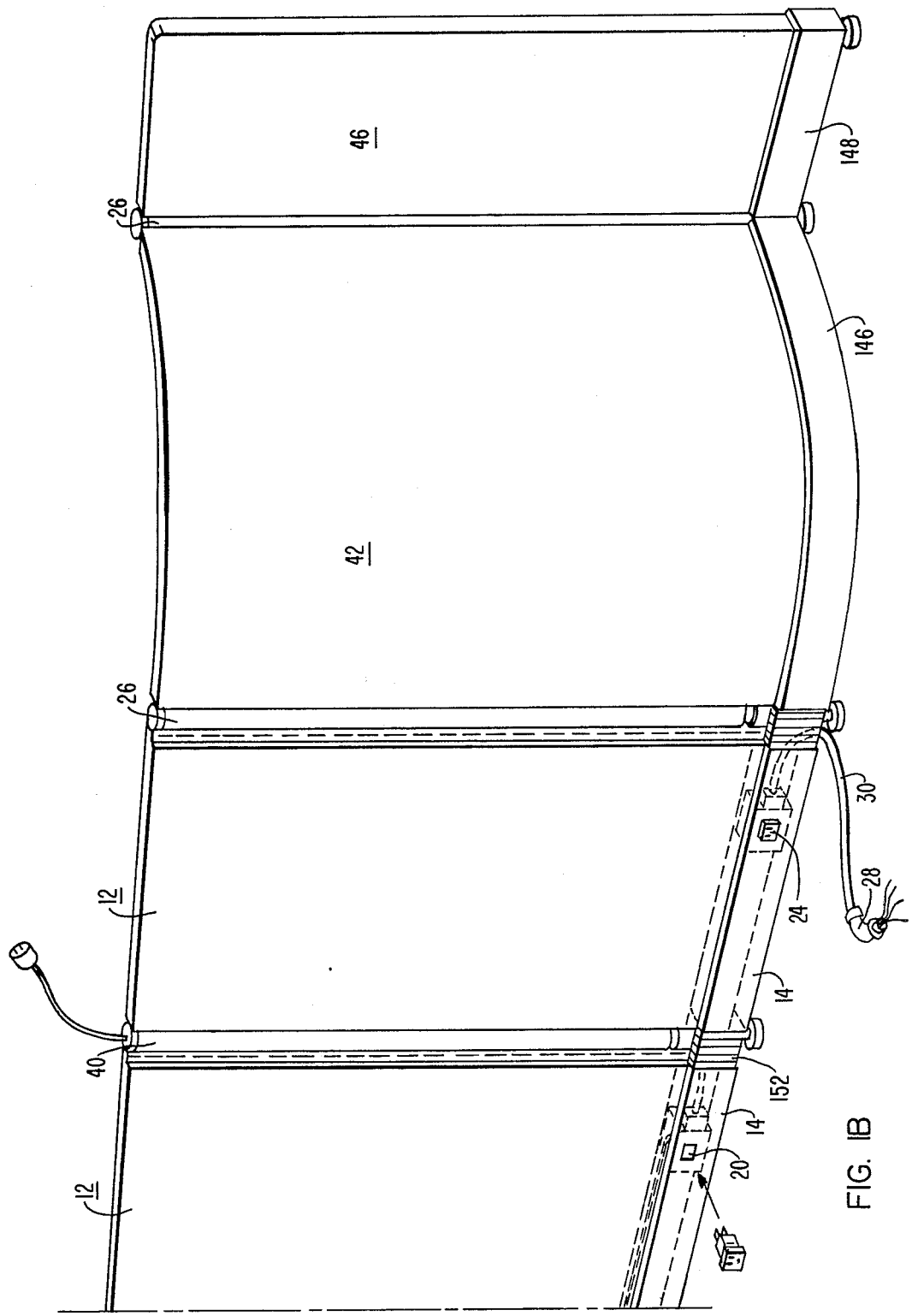

Referring now in detail to the drawings wherein like reference characters represent like parts throughout the several views there is illustrated in FIGS. 1A and 1B the versatile electrified space dividing wall panel system of this invention. The electrified space dividing wall panel system of this invention has as its basic component a wall panel 12 which is generally planar in configuration and carries secured to its bottom edge a horizontal power distribution channel in the form of an elongated, open-ended, covered channel 14. The channel 14 has located adjacent its open ends a pair of terminal blocks 16 which are covered by hinged side walls or cover plates 18 which extend for the length of the channel. Each of the cover plates 18 have apertures 20 therein adjacent the terminal blocks 16 for receiving either dummy outlet plugs 22 or electrical convenience receptacles 24 which can be inserted through the apertures 20 into receptacle receiving recesses in the terminal blocks 16. Each of the space dividing wall panels 12 are interconnected and supported by a tubular post 26 in the manner described in U.S. Pat. No. 3,762,116 issued Oct. 2, 1973 for "Space Divider System and Connector Assembly Therefor" or U.S. Pat. No. 3,877,191 issued Apr. 15, 1975 for "Connector Assembly and Support Post."

Figure 11:
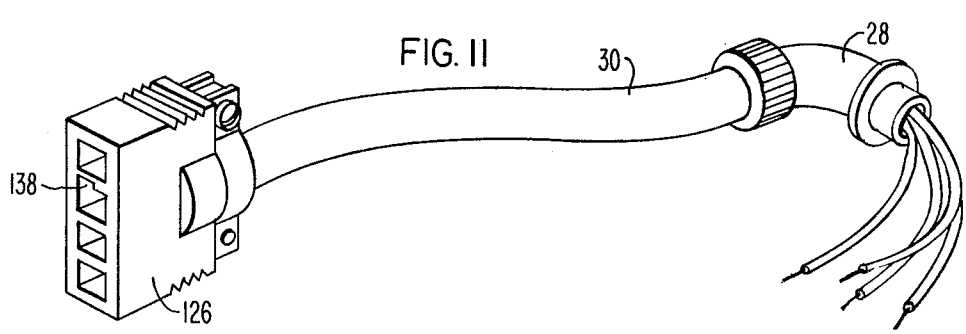
FIG. 11 is an isometric view of the floor infeed cable.

Power can be supplied to the electrified space dividing wall panel system of this invention either from a building system where the power lines are in the floor through the 90 degree box fitting and cable connector illustrated at 28 and 30 and also illustrated in FIG. 11; or from a system wherein the power is distributed through the ceiling by means of the straight-line ceiling infeed illustrated at 32 or by means of a flexible hose infeed illustrated at 34. In each of the latter situations the power is supplied through a ceiling panel 36 from a junction box 38 mounted within the ceiling. U.S. Pat. No. 3,856,981 issued Dec. 24, 1974 for "Power Panel Arrangement" is illustrative and descriptive of a flexible hose type ceiling infeed as employed in connection with the electrified space dividing wall panel system of this invention.

Also illustrated in FIGS. 1A and 1B is a modified cylindrical support post 40 which will be later described in detail and is employed to provide through a separate circuit power to an ambient lighting fixture in a manner and of the type disclosed in U.S. Pat. No. 4,097,918 issued June 27, 1978 for "Illuminated Space Dividing Wall Panel System." A curved panel 42 and an end panel 46 are also illustrated in FIG. 1B and their adaptation to the system will be later described.

The elongated open-ended covered channel 14 is illustrated in FIG. 2 and includes an extruded aluminum central I-shaped channel member 48 surrounded by a shroud or cover 50 which includes the hinged side walls 18 hinged to the base portion at 52. The side walls 18 of the cover plate include at their upper end hooked portions 54 which are adapted to snap over the upturned edge 56 of the I-shaped channel member 48 to retain the side walls 18 in their normally closed position. The I-shaped channel member has cutout portions at each end defined by the upturned rail portion 58 and the downwardly directed bar 60. The terminal blocks 16 have complementary grooves 62 and 64 which receive respectively the rail 58 and bar 60 which serve to retain the terminal block within the channel.

The electrical connection between the two terminal blocks 16 on each end of the channel is accomplished by four electrical wires 66 which provide the dual circuit electrical system of this invention. The wires 66 include a ground wire and a neutral wire common to both circuits and two hot wires. One circuit is employed exclusively for ambient lighting while the other circuit provides current to the baseboard receptacles. More specifically, the common wire is white and labeled W, the ground wire is green and labeled G, the ambient lighting hot line is red and labeled R and the hot line providing current to the convenience receptacles is a black wire and is labeled B. The terminal blocks 16 include two sets of four vertically aligned male power or electrical connecting terminals 68 extending outwardly from the end of the terminal block 16 toward the edges of the panel. These male connectors have been designated W, B, G and R to coincide with the designations to the wires 66 interconnecting the two terminal blocks 16 and to which they are connected.

Each of the terminal blocks 16 have receptacle receiving recesses 70 in the side walls thereof which, when the terminal block is mounted on the I-shaped channel 48, align with the apertures 20 in the cover plate or channel side walls 18. At the bottom of the receptacle receiving recess are three uniquely or unconventionally spaced female slots 72 which are electrically connected respectively to the white, black and green electrical lines with which they are aligned to provide power to that portion of the terminal block. The receptacle receiving recesses are designed to accept the electrical convenience receptacle 24 which has extending from the back thereof three male electrical connector blades 74 which are uniquely situated to be received by the slots 72. This peculiar alignment of the male connector blade 74 and the female slots 72 prevents the use of non-compatible convenience receptacles. In instances where it is not desired to have an electrically activated convenience receptacle at that point on the panel the dummy outlet plug 22 is designed to be retained within the recess 70 through the aperture 20 by means of spring tabs 76. The electrical convenience receptacle 24 is also provided with spring tabs 76 to prevent the inadvertent dislodging of the receptacle from the recess 70 in the terminal block 16.

Figure 5:
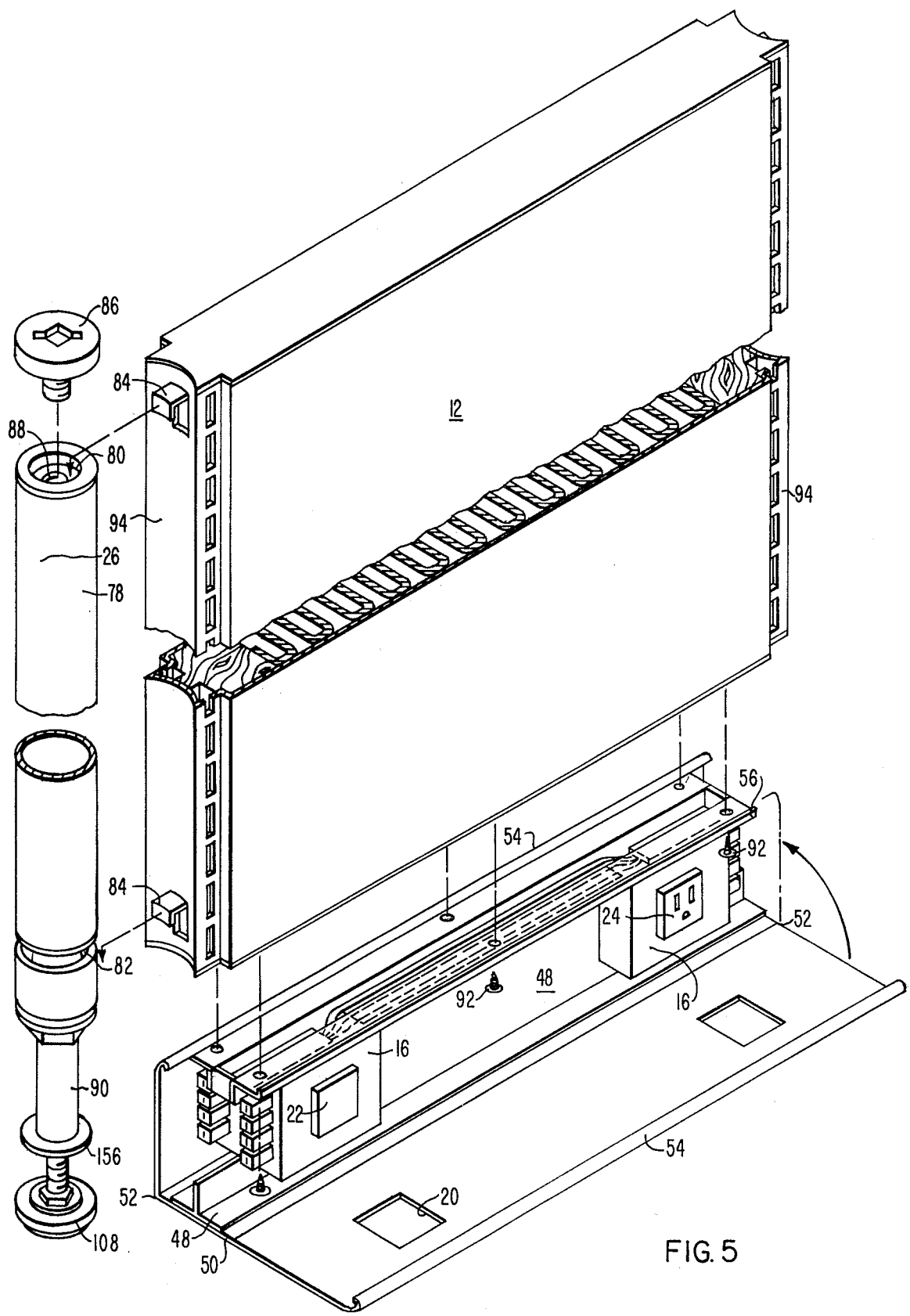
FIG. 5 is an isometric view of a combination support post, wall panel and horizontal baseboard power distribution channel of this invention.

FIG. 5 illustrates a typical assembly of a space dividing wall panel 12, cylindrical support post 26 and the power distribution system of this invention. The cylindrical support post 26 is quite similar to that disclosed in the aforementioned U.S. Pat. No. 3,762,116 and includes a central tubular portion 78 having an annular connector receiving slot 80 at the top end thereof and a similar annular slot 82 adjacent the bottom end each of which receive hook connectors 84 on the edge of the panel 12. A threaded post cap 86 is received in the top of the post by the threaded aperture 80 which secures the hook connectors into the post. A tubular extension 90 is added to the bottom of the post to accommodate the power distribution system. The I-shaped channel 48 is secured to the bottom of the space dividing wall panel 12 by means of a plurality of screws 92 or the like although the method of securing the power distribution system to the bottom of the panel is not material and it can be made as an integral part of the panel if desired.

Figure 6:
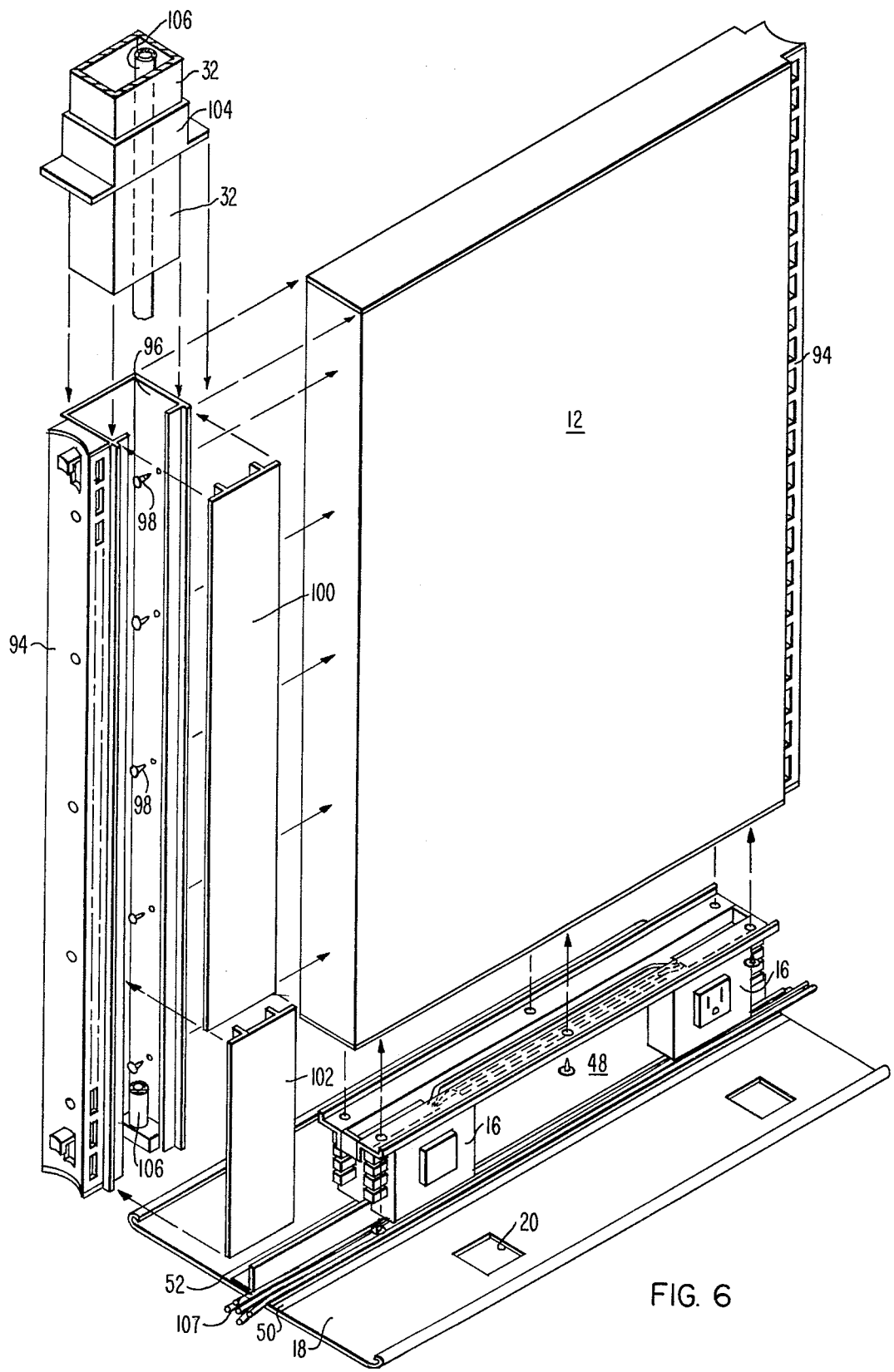
FIG. 6 is a view similar to FIG. 5 including a vertical ceiling infeed power distribution channel.

FIG. 6 illustrates a modified space dividing wall panel 12 which is adapted to accommodate a straight-line ceiling infeed 32. Since the overall width of the panel 12 from slotted standard 94 to slotted standard 94 must be consistent, the panel portion of this panel is slightly shorter as is the I-shaped channel 48 in order to accommodate the vertical power distribution channel 96 which is attached to the end of the wall panel as, for example, by screws 98. Resiliently retained cover plates 100 and 102 close off one side of the vertical power distribution channel 96 and permit access thereto. The straight-line ceiling infeed 32 extends into the top end of the vertical power distribution channel 96 and there is provided a transition collar 104 at the top end of the power distribution channel. The power lines extend from the junction box 38 through the straight-line ceiling infeed and the power distribution channel encased in a tubular metal pipe 106 to separate the electrical system from the remainder of the infeed 32 and power distribution channel 96 in order that the remainder of the channel can carry telephone cables. Adequate space is provided for up to six-25 pair telephone cables and the necessary telephone terminals along with the two-20 amp grounded 120 V ac circuits using four wires. Of course, the four wire power line terminates in a female connector head of the type to be later described. The baseboard power distribution channel 14 is also designed to carry a similar number of telephone cables 107 underneath the terminal blocks at the base of the channel.

FIG. 7 is a sectional view of the post illustrated in FIG. 5 and is substantially identical with that disclosed in the aforementioned U.S. Pat. No. 3,877,191, with the exception that the leveler, foot support 108 which in prior installations was threaded into the threaded aperture 110 in the bottom of the lower connector element 112, is now threaded into the bottom of the post extension 90 which is in turn threaded into the threaded aperture 110 in the base connector 112. This post is utilized in all instances where the baseboard power distribution panel is employed with the exception of those instances where an ambient lighting fixture of the type disclosed in the aforementioned U.S. Pat. No. 4,097,918 are employed. In those instances, the modified post illustrated in FIG. 8 is required.

In the post configuration of FIG. 8 a modified upper connector element 114 and lower connector element 112a are employed along with a modified post extender 90a. The post cap 86a also is modified so that there is an open channel which extends through the lower connector element 112a, the upper connector element 114 and the post top cap 86a in order to accommodate the electrical cord 116 having a plug 118 thereon which can be connected to an ambient lighting fixture. The electrical cord 116 extends through the lower connector element 112a and into the metal sheathed conduit 120 secured in a side aperture 122 in the modified post extender 90a. A metal clip 124 retains the metal sheathed conduit 120 in the aperture 122 and there is provided at the other end of the sheathed metal conduit 120 a female connector head 126 which has four vertically aligned female openings 128 to accommodate the male electrical connectors 68 of a terminal block 16. This female connector head 126 carries only contacts for the white, green and red wires which comprise the ambient lighting circuit.

Figure 9:
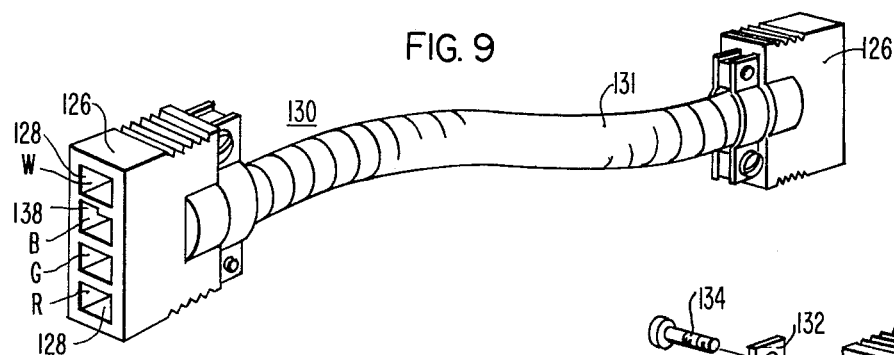
FIG. 9 is an isometric view of the jumper cable having female connector heads on each end thereof.
Figure 10:
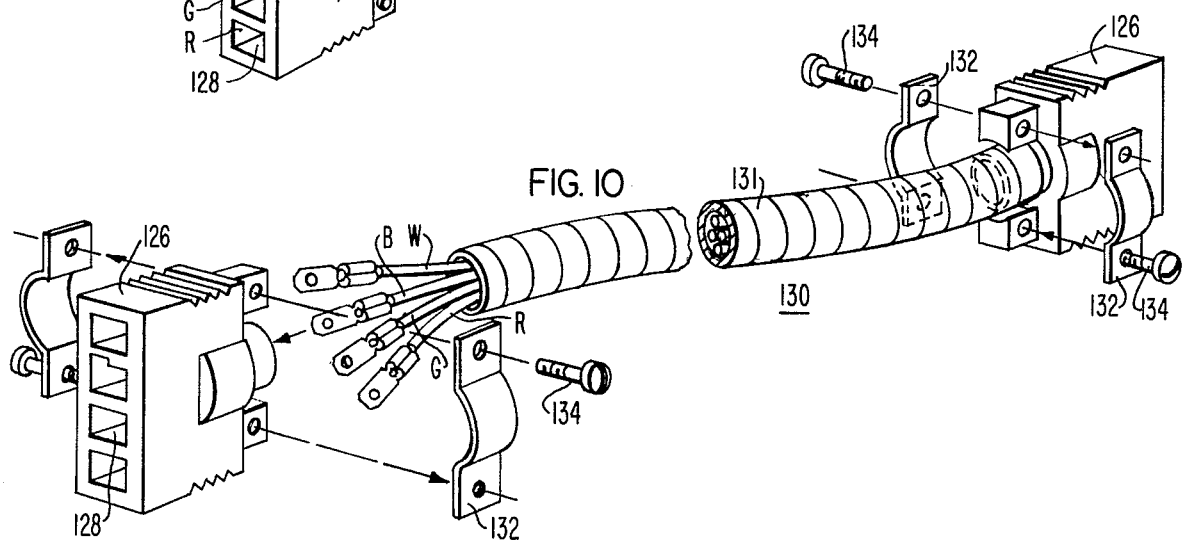
FIG. 10 is an exploded view of the jumper connector of FIG. 9.

FIGS. 9 and 10 illustrate the jumper cables 130 which include a metal sheathed conduit section 131 having a female connector head 126 at each end thereof identical with that disclosed with respect to FIG. 8 with the exception that the conduit 130 contains all four wires of the system, the green ground wire, the white common wire or neutral, the black hot wire for the convenience outlet circuit and the red hot wire for the ambient lighting circuit. The conduit 130 is secured to the female connector heads 126 by conventional clamps 132 and bolts 134.

To prevent improper connection between the openings or apertures 128 in the female connector heads 126 and the male electrical connectors 68 of the terminal blocks, a novel key system is provided. As will be apparent, interconnection of the ground line of one panel with the black convenience outlet power line of another panel and the common line with the red ambient lighting power line of a separate panel through the inadvertent 180° rotation of the female connector head must be prohibited. In order to accomplish this one of the male electrical connectors of the terminal block has a raised portion 136 which gives it a different dimension than the other male terminals and permits it to only be accommodated by the enlarged aperture portion 138 in one of the openings or apertures 128 of the female connector head thereby restricting the interconnection of any female connector head employed in the system and the male electrical connectors 68 of the terminal blocks 16.

The electrified space dividing wall panel employed in connection with the flexible hose ceiling infeed illustrated in FIG. 1A is identical with the panel illustrated in FIG. 6 and described in connection with the straight-line ceiling infeed with the exception that the collar or conversion member 140 includes a cylindrical portion 142 and a tapered rectangular portion 144 as a transition coupling to bring the flexible hose 34 into the vertical power distribution channel 96.

The curved wall panel 42, FIG. 1B, can be provided with terminal blocks, but it is preferable that curved panels be spanned by a simple jumper cable similar to that illustrated in FIGS. 9 and 10 with the exception that the power transmission line employing the steel sheathed conduit 130 is much longer in order to reach from one adjacent electrified space dividing wall panel 12 to the next space dividing electrified wall panel. A simple curved thermoplastic U-shaped cover plate 146 can be provided to encase the conduit 130 extending from one end of the panel to the other. End panels such as the panel illustrated at 46 generally do not need to be electrified and a simple U-shaped false base plate 148 which matches in width and thickness the cover plate 18 may be employed. When a line of partitions end in a post such as illustrated at the left-hand side of FIG. 1A, a one-piece injection molded polypropylene base end cap 150 may be employed for aesthetic purposes. At each junction of electrified space dividing wall panels 12, whether they are linearly aligned or angularly related, a space between the horizontal power distribution channel in the area of the post extender 90 will be present. In order to conceal this intersection and aesthetically finish off the horizontal power distribution channel a decorative corrugated shroud 152 is provided which includes legs 154 which slip into the adjacent power distribution channels. The decorative shrouds are preferably a one-piece injection molded polypropylene and are provided with vertical support by the shroud support collar 156 on the post extender 90.

Figure 12:
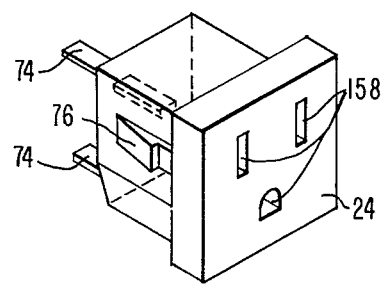
FIG. 12 is an isometric view of a convenience outlet plug adapted for insertion and electrical connection to the terminal block of this invention.

FIG. 12 illustrates the convenience receptacle 24 which will receive a conventional electrical male plug in the slots 158 but which as indicated previously includes uniquely or custom-spaced male connector blades 74 so that by choice either a convenience receptacle 24 or a dummy outlet plug 22 can be inserted into the apertures 20 of the cover plate side walls 18 and consequently into the uniquely or custom-oriented slots 72. With this system the power distribution panel system of this invention can accommodate more work space cubicles on a single 20-amp circuit. The National Electric Code computes each outlet at 1.5 amps, which means that a standard 20-amp circuit can accommodate only thirteen outlets when all of the outlets are hot. By using only outlets which are necessary and providing dummy outlet plugs where electricity is not needed, thirteen outlets can be provided and this can be extended over more than just three panels, which is the limitation when all of the outlets are hot. By using two separate prewired circuits, one for the convenience outlets and the other for the ambient lighting fixtures, exclusively, the ambient lighting can be turned on and off without affecting all of the convenience outlets in the system.

FIG. 13 is a schematic illustration of the distribution of power from four intersecting panels 12 by the female jumper cables 130 and it will be apparent that with power being supplied to the other end of any one of the panels 12 that power is transmitted to each of the other panels 12 about the support post 26. Since each of the female jumper cables 130 carry two separate electrical circuits, it will also be apparent that each of the panels has the facility to accommodate or transmit electrical power to an adjacent panel at its other end so that it may provide power to an ambient light source.

As will be seen from the foregoing the electrified space dividing wall panel system of this invention can accommodate a plurality of space dividing wall panels having elongated open-ended covered channels extending along and secured to the bottom edge thereof providing a horizontal power distribution channel, which panels can be interconnected by a cylindrical support post. A pair of terminal blocks each disposed within the elongated covered channel adjacent opposite ends thereof include two sets of four vertically aligned male electrical connecting terminals extending outwardly and longitudinally of the channel adjacent the open ends of the channel. Means are provided within the channel to electrically connect each terminal block to the other terminal block in that panel and the terminal blocks of adjacent panels can be interconnected by flexible cables having four vertically aligned female electrical receptacles at each end thereof which can be electrically connected to one of the sets of four vertically aligned male terminals on the terminal block to interconnect two panels electrically, or to electrically connect a panel to a source of electric power. The electrified space dividing wall panels can be supplied electric power from either an in-the-floor electrical system or by means of either a straight-line ceiling infeed or a flexible hose ceiling infeed from an electrical power system disposed within the office ceiling.

The hinged cover plate side panels 18 of the vertical power distribution channel can be flipped open to accommodate within the channel, beneath the terminal blocks 16, up to eight telephone or power cables 107. Both sides of the cover plate are hinged at 52 to permit the telephone cables to be laid in from whichever side is most convenient.

The electrified space dividing wall panel system of this invention is extremely versatile by virtue of the flexible jumper cables employed to interconnect adjacent panels and are universal by providing only female connectors at each end of the jumper cables and only male connectors on the terminal blocks within the panels. Additionally, the selective association of convenience receptacles at four points, two on each side of each panel, permits more panels to be utilized on a single circuit, thus reducing initial power requirements to an open office area.

What is claimed is:

1. An electrified space dividing wall panel system comprising:
    a plurality of space dividing wall panels having an elongated open ended covered channel extending along and secured to the bottom edge thereof, said elongated open-ended covered channel extending along and secured to the bottom edge of each panel including hinged side walls providing access to the interior of said channel, said side walls each including at least two spaced apertures therethrough;
    cylindrical support posts having annular slots therein for supporting said space dividing wall panels;
    a pair of spaced terminal blocks each disposed within said elongated covered channel adjacent an opposite end thereof in each of said space dividing wall panels, each of said terminal blocks including two sets of four vertically aligned male electrical connecting terminals extending outwardly longitudinally of said channel adjacent said open ends, one of said male electrical connecting terminals in each of said sets of four vertically aligned male electrical connecting terminals, including a raised portion defining a different shape than the others in said set of four vertically aligned male electrical connecting terminals;
    means electrically connecting each terminal block to the other terminal block in each of said plurality of panels; and
    a plurality of flexible cables having four female electrical receptacles at each end thereof, said female electrical receptacles adapted to electrically connect to one of said sets of four vertically aligned male terminals on a terminal block on one of said panels while the four female electrical receptacles at the other end of said flexible cable are connected to one of said sets of four vertically aligned male terminals on another of said panels while said flexible cable spans said cylindrical post, one of said female electrical receptacles in each of said sets of four female electrical receptacles is of a shape compatible with said one male electrical connecting terminal of a different shape and different from the remaining three female electrical receptacles in said set of four female electrical receptacles.

2. An electrified space dividing wall panel system according to claim 1 wherein said terminal blocks include recesses in the side walls thereof communicating with the apertures in said covered channel, said recesses including three unconventionally spaced female electrical receptacle slots adapted to receive similarly unconventionally spaced male electrical blade connectors from a electrical convenience outlet having conventional female connecting slots therein.

3. The electrified spaced dividing wall panel system according to claim 1 wherein one of said plurality of space dividing wall panels includes a vertical power distribution channel secured to one end thereof and terminating at its lower end adjacent said open-ended covered channel extending along and secured to the bottom edge of said panel, and means extending upwardly from the upper end of said vertical power distribution channel adapted to interconnect said electrified space dividing wall panel to a source of electric power.

4. An electrified space dividing wall panel system comprising:
    a plurality of space dividing wall panels having an elongated open-ended covered channel extending along and secured to the bottom edge thereof and hook shaped connectors along at least one vertical edge thereof;
    cylindrical support posts having annular slots therein constructed and arranged to receive said hooked shaped connectors for interconnecting and supporting said space dividing wall panels;
    a pair of spaced terminal blocks each disposed within said elongated covered channel adjacent on opposite ends thereof in each of said spaced dividing wall panels, each of said terminal blocks including two sets of four vertically aligned male electrical connecting terminals extending outwardly longitudinally of said channel adjacent the open ends thereof;

wire means electrically connecting each terminal block to the other terminal block in each of said plurality of panels; and a plurality of flexible cables having four female electrical receptacles at each end thereof, said four female electrical receptables at one end of a flexible cable adapted to electrically connect to one of said sets of four male terminals on a terminal block on one of said panels when the other four female electrical receptacles at the other end of a flexible cable are connected to one of said set of four male terminals on another of said panels while said flexible cable spans said cylindrical post; and at least one of said support posts having a channel therethrough and an electrical cord having a socket at one end thereof extending through said support post, said electrical cord having a flexible cable at the other end thereof, said flexible cable including four female electrical receptacles on the end thereof, with three of said female electrical receptacles being adapted to electrically connect with one of said sets of four male electrical connecting terminals extending outwardly from said terminal block.

* * * * *